F. W. HILTON.
METHOD OF TRANSFERRING AND KEEPING FISH ALIVE.
APPLICATION FILED MAY 29, 1917. RENEWED AUG. 27, 1918.
1,285,999. Patented Nov. 26, 1918.
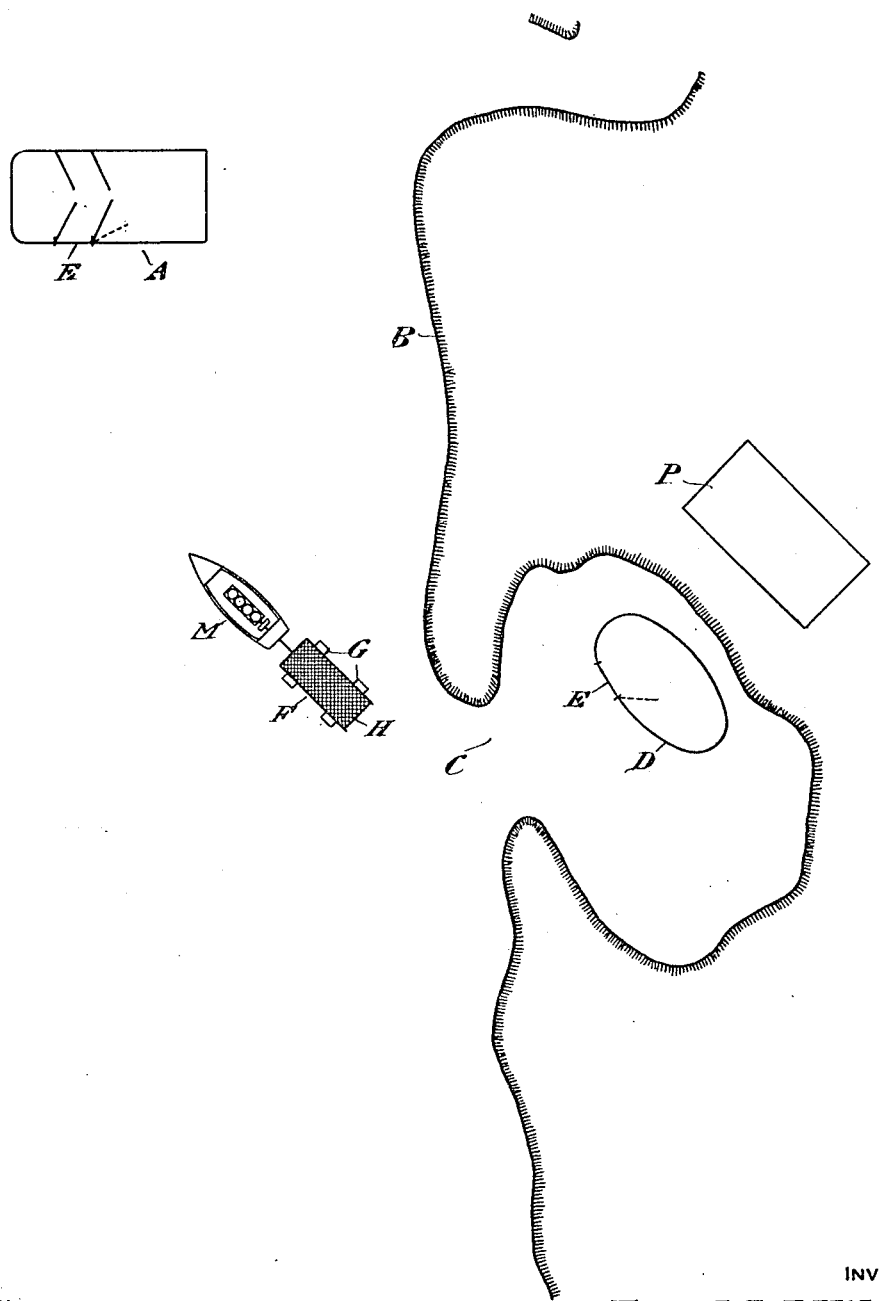
WITNESSES
INVENTOR
Frank W. Hilton
BY Victor J. Evans
ATTORNEY

UNITED STATES PATENT OFFICE.

FRANK W. HILTON, OF PHILADELPHIA, PENNSYLVANIA.

METHOD OF TRANSFERRING AND KEEPING FISH ALIVE.

1,285,999. Specification of Letters Patent. Patented Nov. 26, 1918.

Application filed May 29, 1917, Serial No. 171,760. Renewed August 27, 1918. Serial No. 251,692.

*To all whom it may concern:*

Be it known that I, FRANK W. HILTON, a citizen of the United States, residing at Philadelphia, in the county of Philadelphia and State of Pennsylvania, have invented new and useful Improvements in Methods of Transferring and Keeping Fish Alive, of which the following is a specification.

This invention relates to an improved method of transferring and otherwise handling and keeping fish intended for human consumption in live condition for the longest possible period before actually shipping the same to market.

By the methods of handling fish for food consumption now in general use it has been customary after catching the fish to convey them to warehouses where they are packed in ice if intended for immediate shipment for market. If the fish are to be stored, however, in order to avoid over stocking the market or for other reasons, it is customary to place the same in cold storage where they will be kept in frozen condition until wanted for shipment. This not only involves considerable expense and a cold storage plant but it is also objectionable because the fish when taken from cold storage and thawed for use deteriorate very quickly.

The purpose of the present invention is to provide for the handling of fish in such a manner that they may be kept alive for a very long period and practically until they are wanted for shipment to market.

A further object of the invention is to keep the live fish in such a manner that they will always be available for immediate use.

A further object of the invention is to provide for the transfer of the live fish from the trap or place where they are caught to a cage located in a convenient and easily accessible position with respect to the shore in such a manner as to preserve the fish alive and in good condition while being thus transferred.

In the accompanying drawing a single figure represents in diagrammatic form a simple and preferred construction of the means required for carrying the improved method into practical execution.

Referring to the drawing A designates a trap or inclosure, commonly designated as the pound, which is constructed a considerable distance away from the shore which is indicated at B where the water is deep and frequently rough. The pound may be constructed as a trap into which the fish may be driven or in which they may be placed in live and uninjured condition. This pound is preferably constructed in reasonable vicinity, say within from three to five miles of some natural bay or inlet designated by C and in which, within a short distance of the shore so as to be easily accessible at all times, there is constructed a cage D. The pound A and the cage D may each be of any preferred construction that will enable a large quantity of fish to be confined therein, each being provided with a door E that is preferably arranged in such a manner as to swing inward as indicated in dotted lines, it being understood, however, that each door may be constructed of a single leaf or a plurality of leaves and that slidingly or otherwise supported door structures may be used in place of hingedly supported ones when desired.

For the purpose of transferring the fish from the pound A and the cage D a floating cage, known as the cart F, is utilized, said cart or cage being of any desired construction or capacity, it being constructed preferably of wire fabric and provided with floats G whereby while prevented from sinking it will be maintained in a floating condition. The cart is provided at one end with a door H substantially of the same width as the doors E, and enabling communication to be established between the cart and the pound or between the cart and the cage, as the case may be. The cart is drawn preferably by a motor boat M of any well known construction.

A warehouse or packing house P is erected on the shore in close proximity to the cage D.

When a suitable quantity of fish has been caught or placed in the pound A, the cart F is carried out to the pound and backed up against the same, the doors H of the cart and E of the pound being opened to establish communication between the cart and the pound after which the fishes are driven from the pound into the cart, the doors being immediately closed. The cart is now drawn by the motor boat to the cage situated in the bay or inlet C but in thus towing the loaded cart two considerations of extreme importance must be observed, viz., the cart must be towed with and under no circumstances against the tide, and secondly, the towing must be done at a speed under no circumstances exceeding three miles per hour. It has been discovered during a long experience in catching and handling fish for market that if fish is being towed in a net or cage against the tide or at a speed exceeding three miles per hour, the fish will almost invariably die in transit while if the above precautions be observed the fish may be towed a long distance in live and perfect condition.

When the cage is reached, the cart is backed up against the same, communication being established through the doors E and H, and the fishes are then driven from the cart into the cage after which the cart is disconnected and the doors closed.

The fish, being now confined by a cage in a conveniently accessible position, may be kept alive indefinitely until wanted for use when they may be dipped out or otherwise gathered and transferred to the warehouse or packing house for preparation for shipment.

It is found that by the improved method as herein set forth it is possible to preserve fish, after catching, in live and perfect condition for an indefinite period, thereby saving the expense of cold storage and the deterioration resultant thereon, the producer being enabled to market the fish at the most advantageous time and in the best possible condition for consumption.

I am aware that various contrivances have heretofore been devised for the purpose of keeping fish that have been caught alive for the greatest possible length of time in order that it may be marketed in a perfectly fresh and wholesome condition. Thus, it is not unusual to place fish as it is being caught in a floating trap, usually known as a "live-box", such live-box being subsequently towed to the shore or to a point near the shore where it may be unloaded either immediately or when the contents of the box is required for use. Such operations are usually carried on by individual fishermen and on a comparative small scale. My present invention, however, is intended for operations on a large scale, the purpose being to avoid either entirely or as far as possible the use of cold storage which is at best detrimental to the value of the fish for human consumption. The pound which is an important element in the present invention may be frequently constructed at a considerable distance from the shore, the intention being obviously to locate the said pound on or near the best fishing ground where the water is deep and frequently very rough. In this pound a very large quantity of fish may be placed; frequently, in fact, the result of a considerable number of "catches". At the convenience of the operators, and when the water is in the most favorable condition the fishes are transferred from the pound to the cage D, the latter being a permanent structure which is located in a sheltered position so near in shore as to be at all times very conveniently accessible. This cage also is of large capacity. The fishes being imprisoned therein may be kept alive until wanted; it having been found that almost any length of time may be permitted to elapse between the time of the actual catching of the fish and the time of the delivery thereof from the cage D. It follows that very large quantities of fish which under the present system require to be kept in cold storage in order to prevent spoilage, may be saved in a live condition, to be removed from the cage D only in such quantities as are actually required for present use and to supply the market. The important advantages gained by the present invention reside, therefore, not merely in the saving of the expense of cold storage, but far more in the avoidance of waste by permitting the fishes to die prematurely or in permitting the market to become glutted with an over-supply. By the present invention the demand for absolutely fresh fish may be practically supplied at all times and that without resorting to the wasteful and objectionable methods heretofore used.

Having thus described the invention, what is claimed as new is:

A method of handling fish which consists in confining freshly caught fish in a pound constructed off-shore, driving the fish from said pound into a floating cart through registering openings in the pound and the cart, towing the cart to a cage constructed in a protected location near the shore and easily accessible therefrom, and driving the fish from the cart to the cage through registering openings in the cart and the cage, the fish being confined in the cage until wanted for marketing.

In testimony whereof I affix my signature.

FRANK W. HILTON.

Copies of this patent may be obtained for five cents each, by addressing the "Commissioner of Patents, Washington, D. C."